United States Patent [19]

Spinelli

[11] Patent Number: 5,036,139

[45] Date of Patent: * Jul. 30, 1991

[54] HYBRID ACRYLIC STAR POLYMERS WITH POLYSILOXANE CORES

[75] Inventor: Harry J. Spinelli, Wilmington, Del.

[73] Assignee: E. I. Du Pont de Nemours and Company, Wilmington, Del.

[*] Notice: The portion of the term of this patent subsequent to Jul. 16, 2008 has been disclaimed.

[21] Appl. No.: 414,414

[22] Filed: Sep. 29, 1989

[51] Int. Cl.$^5$ ............................................. C08F 30/08
[52] U.S. Cl. ............................ 525/326.5; 525/326.6; 525/383
[58] Field of Search ............... 525/326.5, 326.6, 383

[56] References Cited

U.S. PATENT DOCUMENTS

| | | | |
|---|---|---|---|
| 3,244,664 | 4/1966 | Zelinski et al. | 260/41.5 |
| 4,185,042 | 1/1980 | Verkouw | 525/332 |
| 4,304,881 | 12/1981 | Aoki et al. | 525/66 |
| 4,579,913 | 4/1986 | Keogh | 525/326.5 |
| 4,659,782 | 4/1987 | Spnelli | 525/293 |
| 4,689,369 | 8/1987 | Ishino et al. | 525/326.5 |
| 4,847,328 | 7/1989 | Hutchins et al. | 525/107 |

FOREIGN PATENT DOCUMENTS

WO90/09403 8/1990 PCT Int'l Appl. .

*Primary Examiner*—Melvyn I. Marquis
*Attorney, Agent, or Firm*—Charles J. Shoaf

[57] ABSTRACT

Hybrid star polymers with acrylic arms and crosslinked polysiloxane cores can be made by a polycondensation of substituent alkoxysilyl groups contained in acrylic ester groups of acrylic block copolymers to form the cores.

11 Claims, No Drawings

HYBRID ACRYLIC STAR POLYMERS WITH POLYSILOXANE CORES

BACKGROUND OF THE INVENTION

This invention concerns star polymers having acrylic arms and crosslinked polysiloxane cores formed by condensation reactions of one or more substituent alkoxysilyl functional groups attached to pendant ester groups of the arms.

A. Aoki et al., U.S. Pat. No. 4,304,881 (1981), prepared styrene/butadiene "living" polymers by anionic polymerization and then coupled them by reaction with silicon tetrachloride to produce a 4-arm star polymer having a silicon atom as a core as shown in Example 4.

H. T. Verkouw, U.S. Pat. No. 4,185,042 (1980), prepared a polybutadiene "living" polymer by anionic polymerization and then prepared a silicon-containing star with up to 3.1 arms by reacting the "living" polymer with gamma-glycidoxypropyltrimethoxysilane.

O. W. Webster, U.S. Pat. Nos. 4,417,034 (Nov. 22, 1983) and 4,508,880 (Apr. 2, 1985), and W. B. Farnham and D. Y. Sogah, U.S. Pat. Nos. 4,414,372 (Nov. 8, 1983) and 4,524,196 (June 18, 1985) showed that acrylic star polymers can be prepared via group transfer polymerization by coupling "living" polymer with a capping agent having more than one reactive site or by initiating polymerization with an initiator which can initiate more than one polymer chain. Initiators that could produce acrylic star polymers with up to 4 arms were demonstrated.

H. J. Spinelli, in U.S. Pat. Nos., 4,659,782 and 4,659,783 issued Apr. 21, 1987, teaches the preparation of acrylic star polymers with crosslinked acrylic cores and at least 5 arms, optionally having functional groups in the cores and/or the arms. Preferably GTP techniques are used to make the polymers.

R. P. Zelinski et al. in U.S. Pat. No. 3,244,664 describe a three-step process for coupling polymer chains involving (1) the preparation of an addition polymer having one or two terminal alkali metal atoms on the polymer main chain, or backbone, then (2) reacting the alkali metal atoms with certain silicic compounds to give a polymer product containing reactive silicon-containing terminal groups, and in which reaction some coupling of molecules can occur, and then (3) further treatment of the product which can provide additional coupling. The polymers can be telechelic (a reactive group on each end of the molecule) or semi-telechelic (a reactive silicic group on only one end). Because of the nature of the process only one alkali metal atom, if any, and therefore only one silicon atom or one silicic group, can be attached directly to any one end of the polymer molecule. The single silicon group per end and the attachment to the end of the polymer backbone limits the nature and extent of the subsequent coupling or crosslinking possible among the molecules. Furthermore, the polymerization process of the reference is subject to termination reactions which result in some polymer chains being unable to react with the silicon group and consequently unable to couple or crosslink at all.

An object of this invention is an improved hybrid star polymer comprised of a crosslinked polysiloxane core with arms of linear acrylate and/or methacrylate polymers.

SUMMARY OF THE INVENTION

This invention provides a hybrid star polymer comprised of a crosslinked polysiloxy core and attached thereto at least 4, preferably more than 4, polyacrylate and/or polymethacrylate arms, each arm being linked to at least one silicon atom comprising the core by means of a chemical bond between a carbon atom contained in an ester group (i.e. alcoholate) portion of the acrylate and/or methacrylate arm polymer and said one silicon atom of the core. By having the silicon group attached to a pendant ester-forming group of the acrylic polymer chain, instead of to the end of the polymer backbone itself, as in Zelinski U.S. Pat. No. 3,244,664, a more stable arm polymer chain less subject to depropagation results.

Such hybrid star polymers can be made by an improved process for the preparation of a silicon-containing branched organic polymer including the steps of forming a linear addition arm polymer having a reactive multifunctional silicon-containing group as a substituent in an end portion of the molecules thereof, and then reacting the silicon-containing groups with each other to couple the polymer molecules with one another wherein the improvement comprises:

1) forming a linear acrylate and/or methacrylate block copolymer by a group transfer polymerization process of acrylate and/or methacrylate monomers in which one end of the copolymer molecules is formed using a group transfer polymerization initiator, and/or a monomer or monomers, which contains as a substituent at least one crosslinkable polyalkoxysilyl group and the other end of the molecule is formed using an acrylate, and/or methacrylate initiator, monomer, and/or monomers, which contains no crosslinkable polyalkoxysilyl substituent; and then 2) crosslinking the alkoxysilyl groups with one another among the copolymer molecules by a polycondensation reaction to form a copolymer having a crosslinked polysiloxy core and more than 4 linear polyacrylate and/or polymethacrylate arms attached thereto.

This invention also provides a linear block polyacrylate and/or polymethacrylate copolymer comprised of two end portions and containing at least one reactive multifunctional crosslinkable silicon-containing group, such as a polyalkoxysilyl group, as a substituent in a pendant acrylate or methacrylate ester group in only one end portion of the polymer molecule. By "copolymer" is meant a polymer chain having at least one monomer unit, either as a final terminal monomer or beginning initiator end unit, or somewhere else along the chain, which monomer unit contains said silicon containing substituent group. By "end portion" is meant not only the actual end units of the polymer chain, but also an end portion constituting less than half, preferably less than 20%, of the monomer units in the polymer chain, with the rest of the chain being free from said reactive silicon groups.

The star polymers can contain, on average, more than 10, but preferably less than 500, arms per core.

The stars preferably have an $M_n$ of at least 5000, and preferably from 25,000 to 1,000,000 for better effectiveness when blended or mixed with other polymer systems.

The number of siloxy substituents per arm and their degree of reaction with one another is selected to avoid gelation of the copolymer and provide a star copolymer having a finite number average molecular weight in order to facilitate its processing and use in combination with other polymer systems.

DETAILED DESCRIPTION OF THE INVENTION

In the star polymer products of this invention the core contains at least one silicon atom for each arm. The arms are attached to the core by means of chemical bonds with one or more core silicon atoms. The ratio of core silicon atoms to the number of arms preferably is within the range of 1:1 to 8:1, and more preferably 2:1 to 5:1. Preferred arm molecular weights prior to the condensation reaction are in the range of 1,000 to 20,000 number average molecular weight, Mn.

The arm block co-polymers can be prepared by a process in which the arm polymer is made to contain one or more silicon groups capable of undergoing a condensation polymerization reaction with each other to form a crosslinked polysiloxane. The silicon groups are preferably contained in one or more monomer units at or near one end of the arm polymer, or in a block of monomer units near one end of the arm polymer molecule. The monomer units containing the reactive silicon group may be adjacent to one another, or separated from one another randomly in a block segment of the arm polymer. They may be located either at the initiator end of the polymer chain or at the other end. However, when the initiator contains a reactive siloxy group, any other such groups must be at that end portion as well.

Preferably the reactive alkoxysilyl groups are located on the alcoholate portion of the ester groups in a segment of the arm polymer which consists of less than half of the monomer units of what the arm is comprised, and preferably less than 20% of the arm units in order to achieve star formation with the desired core structure, while avoiding gelation and crosslinking of the copolymer in bulk to an infinite molecular weight making it impossible to blend with other polymer systems.

Higher crosslinking density is achieved with one or more silicon containing polymer units at or adjacent to a terminal end of the arm molecule. A more open crosslink structure results when the silicon-containing monomer units are separated from one another by non-crosslinkable acrylate and methacrylate monomer units. In general, the more open the crosslink structure of the core, the greater the number of arms which can be condensed to form the core.

Arm polymers can be made by a group transfer polymerization (GTP) process preferably of the type taught in U.S. Pat. No. 4,417,043 to Webster and in U.S. Pat. No. 4,659,782 to Spinelli. The disclosures of which are incorporated herein by reference.

The reactive core-forming silicon groups in the arm polymer prior to crosslinking are attached to the ester portion of the acrylate or methacrylate monomer as for example in 3-(trimethoxy)silylpropyl methacrylate; or in the GTP initiator such as in 1-trimethylsiloxy-l(3-trimethoxysilyl)propoxy-2-methyl propene. Both of these can be used together as well.

The reactive silicon groups are preferably of the formula —Si—(OR)$_3$ wherein R is hydrocarbyl, and preferably an aliphatic hydrocarbon group containing up to 5 carbon atoms.

After preparation of the arm polymers, the living polymer is quenched to remove the living GTP groups and, simultaneously therewith or subsequently, the crosslinkable silicon groups are crosslinked with one another by hydrolysis of the —OR groups to result in a crosslinked siloxane core structure. The term "crosslinkable" distinguishes the core-forming silicon groups from the group transfer-initiating groups which contain silicon such as in a trimethylsiloxy initiator group as opposed to a trialkoxysilyl crosslinkable group.

The resulting star polymers may be used as formed in solution, or dispersion, or isolated for subsequent use.

The star polymers may be used as additives for liquid systems such as for rheology control or for incorporation into other polymers and resin systems to modify their properties.

The linear block copolymers of this invention are useful not only for direct preparation of the hybrid star polymers of the invention by self-condensation reactions, but they also may be isolated and subsequently condensed to form the star polymer in situ, for example in a film, or plastic sheet and so forth. In addition they can be co-reacted with other silicone-forming materials or suitable condensation reactants to form other modified hybrid polymer systems for subsequent processing and use, or in situ.

Preferably, for making the arms of star polymers of the invention, the monomers have one carbon-carbon double bond polymerizable by a group transfer polymerization process selected from

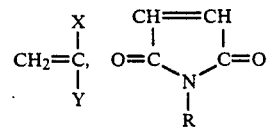

and mixtures thereof wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R";

each R$_1$ is independently selected from C$_{1-10}$ alkyl and C$_{6-10}$ aryl or alkaryl;

R is C$_1$·alkyl, alkenyl, or alkadienyl; C$_{6-20}$ cycloalkyl, aryl, alkaryl or aralkyl; any of said groups containing one or more ether oxygen atoms within aliphatic segments thereof; and any of all the aforesaid groups containing one or more functional substituents that are unreactive under polymerizing conditions; and each of R' and R" is independently selected from C$_1$-alkyl.

Also preferably in the preparation of arm polymers of the invention, the "living" group transfer polymerization, (GTP), sites are (R$^1$)$_3$M— wherein: R$^1$ is selected from C$_1$ alkyl and C$_{6-10}$ aryl or alkaryl; and M is Si, Sn, or Ge.

In particular, suitable GTP processes and their mechanism are described in U.S. Pat. No. 4,659,782 at column 6, line 60 through column 9, line 20 which is incorporated herein by reference.

As a preferred way to make hybrid star polymers of this invention, one first prepares acrylic arms by using a functional block copolymer prepared by GTP and then prepares a crosslinked, non-acrylic core by using some type of polysiloxane condensation crosslinking reaction involving a segment of the starting GTP block copolymer which contains the appropriate silicon group or groups. The self-stabilized particle which is thus produced has acrylic arms and a polysiloxane condensation core (hence the name "hybrid") as opposed to stabilized star polymer molecules which have acrylic arms and acrylic cores.

The differences between all-acrylic stars and the subject hydrid stars are primarily associated with the polysiloxy condensation core. The condensation core obtained in the hybrid process is less acrylic in nature than that produced in the all-acrylic process. Thus the swelling of the core or the sensitivity of the core to changes in solvent composition may take on characteristics more resembling polysiloxanes. This aspect can be important in using the solubility difference to control particle size during synthesis, and perhaps properties such as refractive index after the particle was made, or hardness and softness of the core depending on its cross-link density. The hardness/softness of the core can have an effect on impact resistance and toughness, especially when these hybrid stars are used in combination with various types of acrylic and non-acrylic plastics.

The size, polarity and hardness of the condensation core can be controlled by controlling the size of the starting functional segment together with the amount, type and functionality of the crosslinker which is used. The ability to use a previously isolated and characterized functional block copolymer, already containing the crosslinkable substituent, as the starting material for a hybrid star can be an advantage in that control over the final stabilized particle is not dependent on the existence of a "living" non-isolated intermediate (e.g., attached and unattached arms). The sequential nature of the process—production of the functional block copolymer first followed by formation of the stabilized particle—is important, however, it is not necessary to isolate the starting functional arm block copolymer in order to prepare a hybrid star, but isolation may sometimes provide an advantage.

The nature and composition of the acrylic arms can be controlled and varied as desired using the same techniques that are used for preparing the functional segment of the block copolymers, or for the preparation of arms for all-acrylic stars.

Known uses of hydrocarbon stars together with the uses of all-acrylic stars are appropriate uses for the subject hybrid stars, with particular emphasis on the ability in the stars of this invention to control the particle size, polarity and energy-absorbing nature (hardness/softness) of the condensation core and customize the star for the particular use desired, in terms of compatibility and modification needed.

In addition to the uses of star polymers of the invention in coatings and as tougheners for plastic sheeting and in the other applications indicated above, such star polymers have many other potential uses, as do other products made by group transfer polymerization. These can include cast, blown, spun or sprayed applications in fiber, film, sheet, composite materials, multilayer coatings, photopolymerizable materials, photoresists, surface active agents including soil repellants and physiologically active surfaces, adhesives, adhesion promoters and coupling agents, among others. Uses include as dispersing agents, rheology control additives, heat distortion temperature modifiers, impact modifiers, reinforcing additives, stiffening modifiers and applications which also take advantage of narrow molecular weight and low bimodal polydispersity. End products taking advantage of available characteristics can include lacquers, enamels, electrocoat finishes, high solids finishes, aqueous or solvent based finishes, clear or filled acrylic sheet or castings, including automotive and architectural glazing and illumination housings and refractors, additives for oil and fuel, including antimisting agents, outdoor and indoor graphics including signs and billboards and traffic control devices, reprographic products, and many others.

EXAMPLE 1

PMMA Star Made Using a Random Block of (Trialkoxy)-Silylpropyl Methacrylate (DP3) and MMA A 250 ml flask is equipped with mechanical stirrer, thermometer, nitrogen inlet, and addition funnels. The flask is charged with tetrahydrofuran (89.4 gm), methyl methacrylate (1.89 gm, 0.0189 mole), 3-(trimethoxy)-silylpropyl methacrylate (4.53 gm - 0.0183 mole), p-xylene (1.2 gm), bis(dimethylamino)methyl silane (0.56 gm), and tetrabutylammonium m-chlorobenzoate (60 ul of a 1.0M solution in acetonitrile). To this is added 1-trimethylsiloxy-1-methoxy-2-methyl propene (1.04 gm - 0.006 mole) initiator. This starts the polymerization of the first block. A feed of tetrabutylammonium m-chlorobenzoate (60 ul of a 1.0M solution in acetonitrile) and terahydrofuran (4.1 gm) is then started and added over 120 minutes. After 60 minutes, a feed of methyl methacrylate (57.55 gm, 0.576 mole) is started and added over 40 minutes. This generates a linear polymer that has a block of MMA at one end and a random block of MMA/3-(trimethoxy)silylpropyl methacrylate at the other end. The monomers are 99.9% converted. The molecular weight of this polymer is $Mn=9,600$ and $Mw=12,600$.

To the polymer solution is added water (4.5 gm), methanol (2.0 gm), and tetrabutylammonium fluoride (0.25 ml of a 1.0M solution). This is refluxed for 2 hours. This results in a solution of a hybrid star polymer. The polymer has a cross-linked polysiloxane core, has a $Mn=77,600$ and $Mw=391,000$ and an average of at least about 30 arms of PMMA.

EXAMPLE 2

PMMA Star Made as in Example 1 with an Increased Amount of Silylpropyl Methacrylate A 250 ml flask is equipped with mechanical stirrer, thermometer, nitrogen inlet, and addition funnels. The flask is charged with tetrahydrofuran (90.5 gm), methyl methacrylate (1.75 gm, 0.0175 mole), 3-(trimethoxy)-silylpropyl methacrylate (7.33 gm - 0.0296 mole), p-xylene (1.2 gm), bis(dimethylamino)methyl silane (0.56 gm), and tetrabutylammonium m-chlorobenzoate (60 ul of a 1.0M solution in acetonitrile). To this is added 1-trimethylsiloxy-1-methoxy-2-methyl propene (0.97 gm - 0.056 mole). This starts the polymerization of the first block. A feed of tetrabutylammonium m-chlorobenzoate (60 ul of a 1.0M solution in acetonitrile) and terahydrofuran (4.1 gm) is then started and added over 120 minutes. After 60 minutes, a feed of methyl methacrylate (57.55 gm, 0.576 mole) is started and added over 40 minutes. This generates a linear polymer that has a block of MMA and a block of MMA/3-(trimethoxy)silylpropyl methacrylate. The monomers are 99.9% converted. The molecular weight of this polymer is $Mn=12,400$ and $Mw=17,600$.

To the polymer solution is added water (4.5 gm), methanol (2.0 gm), and tetrabutylammonium fluoride (0.25 ml of a 1.0M solution). This is refluxed for 2 hours to quench the living polymer and to hydrolyze and crosslink the alkoxy-silyl groups. A star polymer having a crosslinked polysiloxane core is formed that has a $Mn=205,000$ and $Mw=5,166,000$ and an average of about 300 arms.

EXAMPLE 2A

A 38 liter stirred autoclave was charged with 1.0 kg ethylene vinyl acetate copolymer resin having a melt index of 2500 and a vinyl acetate content of 14 wt. %, 16 liters of carbon tetrachloride, and 4 liters of chloroform. The autoclave was closed and the pressure was set at 0.21 MPa. The reaction mixture was heated to 105° C. and held there until the resin dissolved; then addition of 2.7 ml/min initiator solution (1% 2,2'-azobis-[2-methylpropane nitrile] in chloroform) was instituted. Chlorine gas was added to the reaction mixture at a rate of 7.7 g/minutes. After chlorine had been added for 15 minutes, the reaction temperature was lowered to 95° C. Chlorination was continued at constant catalyst and chlorine feed rate for 6.25 hours. Following a degassing step to remove the unreacted chlorine the autoclave was cooled and discharged. The reaction mixture was filtered and the chlorinated ethylene vinyl acetate copolymer was isolated by drum drying. Elemental analysis indicated that the polymer contained 58.5 wt. % chlorine. The chlorinated polymer had a number average molecular weight of about 12,000.

Coating compositions were prepared by mixing the materials shown in Table I, in the ratios indicated, with the binder composition of chlorinated ethylene vinyl acetate, the branched polymethyl methacrylate soluble acrylic star polymer and the plasticizers dioctyl phthalate and chlorinated paraffin. The composition was transferred to a ball mill and mixed for four days on a roller.

Film samples of the coating compositions were prepared by spraying the mixed compositions shown in Table I with an air pressure pot at a pressure of 4.5-9.0 kg onto unprimed cold rolled steel panels. The panels were air dried at room temperature for 24 hours and then vacuum dried at 50° C. for 72 hours before testing. The coating compositions were evaluated for sprayability and film properties according to the test methods described herein. Test results are summarized in Table.

TABLE I

| | Example 2 | |
|---|---|---|
| Paint Composition | | |
| Chlorinated Ethylene Vinyl Acetate (58.5% Cl) | 15.15 | |
| Star Polymethyl Methacrylate from Example 2 | 1.52 | |
| "Chlorowax" LV[1] | 3.64 | |
| "Fluorad" 430 Fluoroaliphatic Polymeric Ester | 0.13 | |
| Barium Sulfate | 7.84 | |
| Titanium Oxide | 12.17 | |
| Magnesium Silicate, micronized | 19.55 | |
| Solvesso 100 Aromatic Solvent | 6.00 | |
| Xylene | 5.00 | |
| Toluene | 1.78 | |
| Methyl Ethyl Ketone | 16.73 | |
| Tetrahydrofuran | 0.50 | |
| Film Properties | | |
| Tensile Strength, MPa | 4.8 | |
| Elongation at Break, % | 20 | |
| Chemical Resistance | | |
| Acids (Avg.) | 9.2 | |
| Bases (Avg.) | 8.7 | |
| Solvents (Avg.) | 6.6 | |
| Chip Resistance | 8 | |
| Impact | A* | B** |
| 40 lbs | 10 | 10 |
| 80 lbs | 10 | 10 |
| 120 lbs | 10 | 9 |
| 160 lbs | 9 | 9 |

[1] 39 wt. % Cl, MW = 545
*Concave
**Convex

TEST METHODS

The following test methods were used:
Tensile Strength—ASTM D-412
Elongation at Break—ASTM D-412
Chemical Resistance—Unprimed cold rolled Steel panels were coated with a binder composition containing pigment and/or fillers in a solvent applied by spraying with an air pressure pot at a pressure range between 4.5-9.0 kg. The panels were air dried at room temperature for 24 hours and then vacuum dried at 50° C. for 48 hours. For each chemical to be tested a 25 mm diameter circle was drawn on the panel and a drop of the chemical to be tested was placed within the circle. The drop was covered with a 2.5 cm plastic bottle lid to retard evaporation. After 24 hours at ambient temperature the lids were removed and the panels were washed with water to remove the test chemicals. After towel drying to remove surface residue, the panels were air dried to 24 hours and evaluated according to the following scale:

10.0 No evidence of damage
8.0 Barely detectable spot
6.0 Definite spot, but no lifting
4.0 Glossing, discoloration, etching, slight lifting or slight blistering
2.0 Definite lifting or blistering Definite separation from substrate.
0.0 Dissolution or permanent removal of film by corrosive action.

Chip Resistance—A 10×30 cm cold rolled steel panel coated as described in the chemical resistance test is held at 0° F. (−17.8° C.) for one hour. The air pressure in a QGR Gravelometer, (available from Q Panel Co., Cleveland, Ohio), is set at 70 psi (0.4MPa) and one pint of gravel, graded to a size ⅜-⅝ in. (0.95-1.59 cm, available from Q Panel Co.) preconditioned at 0° F. (−17.8° C.) is added to the gravelometer hopper. The steel panel is placed into the gravelometer and the gravel is projected against the panel until the test is completed. The panel is then rated on a scale of 0-10 with 10 being the highest rating to evaluate the amount of coating composition removed by the stones.

Impact Test—A coated steel panel coated as described in the chemical resistance test is placed in a Gardner Impact Tester, (available from Paul N. Gardner Co., P.O. Box 6633, Station 9, Fort Lauderdale, Fla.). The weighted steel rod is raised to different calibrated heights for specific impact forces and released to impact against the panel. Both concave and convex impacts are determined on the coated side of the panel. The panel is evaluated for impact resistance by inspection for surface cracks and delamination on a scale of 0-10, with 10 being the highest range.

Grid Hatch Adhesion—A coated cold rolled steel panel, prepared as described in the chemical resistance test was scored with a series of ten paralle grooves 1 in. (2.54 cm) long and 0.1 cm apart with a gridhatch adhesion scribe (available from Paul N. Gardner Co.). A second series of grooves is scribed at a 90° angle to the first series. A strip of "Scotch" brand #610 cellophane tape, 1 in. wide is applied to cover the grid, leaving a 2 in. length of tape extending past the bottom of the grid. The tape is rubbed firmly with a pencil eraser. The tape is removed by grasping the end and sharply pulling toward the tester, parallel to the coated surface, but not in a peeling fashion. Adhesion is rated by measuring the amount of film removed on a scale of 0-10, with 10 being the highest rating.

EXAMPLE 3

PMMA Star Made Using a Crosslinkable Silicon-Containing Initiator as well as the Monomers of Examples 1 and 2

A 250 ml flask is equipped with mechanical stirrer, thermometer, nitrogen inlet, and addition funnels. The flask is charged with tetrahydrofuran (93.5 gm), methyl methacrylate (2.38 gm, 0.0238 mole), 3-(trimethoxy)silylpropyl methacrylate (1.46 gm - 0.0059 mole), p-xylene (1.2 gm), bis(dimethylamino)methyl silane (0.56 gm), and tetrabutylammonium m-chlorobenzoate (60 ul of a 1.0M solution in acetonitrile). To this is added 1-trimethylsiloxy-1-(3-trimethoxysilyl)propoxy-2-methyl propene (1.76 gm - 0.0055 mole). This starts the polymerization of the first block. A feed of tetrabutylammonium m-chlorobenzoate (60 ul of a 1.0M solution in acetonitrile) and terahydrofuran (4.1 gm) is then started and added over 120 minutes. After 60 minutes, a feed of methyl methacrylate (57.2 gm, 0.572 mole) is started and added over 40 minutes. This generates a linear polymer that has a block of MMA/3-(trimethoxy)silylpropyl methacrylate and then a block of MMA. The monomers are 99.9% converted. The molecular weight of this polymer is Mn=9,600 and Mw=11,500.

To the polymer solution is added water (3.0 gm), methanol (4.0 gm), and tetrabutylammonium fluoride (0.25 ml of a 1.0M solution). This is refluxed for 2 hours. A solution of a star polymer is formed that has a Mn=52,000 and Mw=186,000 and about 16 arms.

EXAMPLE 4

PMMA Star of Example 3 Using More Trimethoxy Silyl Monomer (DP3)

A 250 ml flask is equipped with mechanical stirrer, thermometer, nitrogen inlet, and addition funnels. The flask is charged with tetrahydrofuran (91.6 gm), methyl methacrylate (2.3 gm, 0.023 mole), 3-(trimethoxy)silylpropyl methacrylate (4.6 gm - 0.0185 mole), p-xylene (1.2 gm), bis (dimethylamino)methyl silane (0.56 gm), and tetrabutylammonium m-chlorobenzoate (60 ul of a 1.0M solution in acetonitrile). To this is added 1-trimethylsiloxy-1-methoxy-2-methyl propene (1.75 gm - 0.0055 mole). This starts the polymerization of the first block. A feed of tetrabutylammonium m-chlorobenzoate (60 ul of a 1.0M solution in acetonitrile) and terahydrofuran (4.1 gm) is then started and added over 120 minutes. After 60 minutes, a feed of methyl methacrylate (56.5 gm, 0.565 mole) is started and added over 40 minutes. This generates a linear polymer that has a 3-(trimethoxy)silylpropyl methacrylate and then a block of MMA. The monomers are 99.9% converted. The molecular weight of this polymer is Mn=10,300 and Mw=12,800.

To the polymer solution is added water (3.0 gm), methanol (4.0 gm), and tetrabutylammomnium fluoride (0.25 ml of a 1.0M solution). This is refluxed for 2 hours. A star polymer is formed that has a Mn=129,000 and Mw - 2,191,000 and about 170 arms per core.

EXAMPLE 5

PMMA Star Made Using a Block of the Silylpropyl Monomer (DP4)

A 250 ml flask is equipped with mechanical stirrer, thermometer, nitrogen inlet, and addition funnels. The flask is charged with tetrahydrofuran (91.0 gm), 3-(trimethoxy)silylpropyl methacrylate (5.68 gm - 0.0229 mole), p-xylene (1.2 gm), bis(dimethylamino)methyl silane (0.30 gm), and tetrabutylammonium m-chlorobenzoate (80 ul of a 1.0M solution of acetonitrile). To this is added 1-trimethylsiloxy-1-methoxy-2-methyl propene (0.86 gm - 0.0049 mole). This starts the polymerization of the first block. A feed of tetrabutylammonium m-chlorobenzoate (80 ul of a 1.0M solution in acetonitrile) and terahydrofuran (4.1 gm) is then started and added over 120 minutes. After 60 minutes, a feed of methyl methacrylate (53.45 gm, 0.535 mole) is started and added over 40 minutes. This generates a linear polymer that has a block of MMA (DP 109) and a block of 3-(trimethoxy)silylpropyl methacrylate. The monomers are 99.9% converted. The molecular weight of this polymer is Mn=11,600 and Mw=18,600.

To the polymer solution is added water (2.45 gm), methanol (4.0 gm), and tetrabutylammonium fluoride (0.5 ml of a 1.0M solution). This is refluxed for 2 hours. A star polymer is formed that has a Mn=164,000 and Mw=675,000 and about 36 arms per core of crosslinked polysiloxane.

EXAMPLE 6

MMA/EMA Star That Contains Hydroxyl Functionality and is Made Using a Random Block of Silylpropyl Methacrylate (DP5) and MMA in the Arms for Crosslinking A 500 ml flask is equipped with mechanical stirrer, thermometer, nitrogen inlet, and addition funnels. The flask is charged with tetrahydrofuran (73.4 gm), toluene (783.5 gm) methyl methacrylate (8.47 gm, 0.085 mole), 3-(trimethoxy)silylpropyl methacrylate (24.67 gm - 0.100 mole), p-xylene (1.2 gm), bis(dimethylamino)methyl silane (0.32 gm), and tetrabutylammonium m-chlorobenzoate (200 ul of a 1.0M solution in acetonitrile). To this is added 1-trimethylsiloxy-1-methoxy-2-methyl propene (3.23 gm - 0.0186 mole). This starts the polymerization of the first block. A feed of tetrabutylammonium m-chlorobenzoate (200 ul of a 1.0M solution in acetonitrile) and terahydrofuran (4.1 gm) is then started and added over 120 minutes. After 60 minutes, a feed of methyl methacrylate (71.7 gm, 0.717 mole) and ethyl methacrylate (74.5 gm, 0.654 mole) is started and added over 40 minutes. Twenty minutes after the MMA/EMA feed is done 2-trimethylsiloxyethyl methacrylate (4.21 gm, 0.0208 mole) is added in one shot. This generates a linear polymer that has a block of MMA/3-(trimethoxy)silylpropyl methacrylate, a block of MMA/EMA, and a block of 2-hydroxyethyl methacrylate which is blocked with a trimethylsilyl group. The monomers are 99.9% converted. The molecular weight of this polymer is Mn=9,800.

To the polymer solution is added water (15.3 gm), methanol (10.0 gm), i-propanol (36.6 gm), and tetrabutylammonium fluoride (0.6 ml of a 1.0M solution). This is refluxed for 2 hours. This removes the blocking group from the hydroxyethyl methacrylate and condenses the arms into a star. A star polymer having a crosslinked polysiloxane core and about 25 arms per core is formed that has a Mn=62,400 and Mw=480,000. The star has hydroxyl groups located in a segment at the ends of the MMA/EMA arms.

EXAMPLE 6A

The following compositions can be prepared and then blended together to form a high solids white enamel.

| | |
|---|---|
| Acrylic Polymer Solution (a polymer of styrene/methyl methacrylate/butyl acrylate/hydroxyethyl acrylate 15/15/40/30 prepared at 75% solids in methyl amyl ketone using conventional free radical techniques) | 70.5 |
| Star Polymer (from Example 6) | 25.0 |
| White Millbase (a standard millbase composed of 70% white pigment, 10% acrylic polymer [from the solution polymer described above] and 20% methyl amyl ketone | 71.4 |
| Melamine Resin | 30.0 |
| P-toluene Sulfonic Acid Solution (17.7% P-toluene sulfonic acid, 12.5% dimethyloxazolidine, and 69.8% methanol) | 2.8 |
| Xylene | 60.0 |
| Methyl Amyl Ketone | 40.3 |
| Total | 300.0 |

The above composition is sprayed onto a steel panel primed with an alkyd primer and baked for 30 minutes at about 120° C. and gives a glossy, hard finish with a good appearance. The finish is resistant to weathering, solvents, scratches, and chips. The coating composition is useful for finishing cars and trucks.

The above composition when sprayed and baked does not sag. Controls that do not contain any star polymer do gas when placed in the baking oven. The star polymer is useful in coatings.

EXAMPLE 7

PMMA Star with 2000 MW Arms and Made Using a Trialkoxysilyl Group only in the Initiator A 250 ml flask is equipped with mechanical stirrer, thermometer, nitrogen inlet, and addition funnels. The flask is charged with tetrahydrofuran (61.6 gm), p-xylene (1.2 gm), 1-trimethylsiloxy-1-3-(trimethoxysilyl)-propoxy-2-methyl propene (9.65 gm - 0.30 mole), and tetrabutylammonium m-chlorobenzoate (150 ul of a 1.0M solution in acetonitrile). A feed of tetrabutylammonium m-chlorobenzoate (150 ul of a 1.0M solution in acetonitrile) and terahydrofuran (4.1 gm) is then started and added over 120 minutes. A feed of methyl methacrylate (60.1 gm, 0.601 mole) is started and added over 40 minutes. This generates a linear polymer that has one 3-(trimethoxy)silylpropoxy group at the end of a PMMA linear polymer. The monomers are 99.9% converted. The molecular weight of this polymer is Mn=1,900 and Mw=2,490.

To the polymer solution is added water (2.6 gm), methanol (4.0 gm), and tetrabutylammonium fluoride (0.25 ml of a 1.0M solution). This is refluxed for 2 hours. A star polymer having a cross-linked polysiloxane core is formed that has a Mn=8,250 and Mw=11,000 and an average of about 4.4 arms per core.

EXAMPLE 8

PMMA Star with 10,000 MW Arms and Core Made Using Silicon only for Crosslinking Initiator A 250 ml flask is equipped with mechanical stirrer, thermometer, nitrogen inlet, and addition funnels. The flask is charged with tetrahydrofuran (61.6 gm), p-xylene (1.2 gm), 1-trimethylsiloxy-1-3-(trimethoxysilyl)-propoxy-2-methyl propene (1.98 gm - 0.080 mole), and tetrabutylammonium m-chlorobenzoate (30 ul of a 1.0M solution in acetonitrile). A feed of tetrabutylammonium m-chlorbenzoate (30 ul of a 1.0M solution in acetonitrile) and terahydrofuran (4.1 gm) is then started and added over 120 minutes). A feed of methyl methacrylate (60.9 gm, 0.609 mole) is started and added over 40 minutes. This generates a linear polymer that has one 3-(trimethoxy)silylpropoxy group at the end of a PMMA linear polymer. The monomers are 99.9% converted. The molecular weight of this polymer is Mn=10,600 and Mw=11,700.

To the polymer solution is added water (0.8 gm), methanol (1.3 gm), and tetrabutylammonium fluoride (0.03 ml of a 1.0M solution). This is refluxed for 2 hours. A star polymer is formed that has a Mn=47,800 and Mw=58,100 and an average of about 5 arms per core.

I claim:

1. A hybrid star polymer comprised of a cross-linked polysiloxane core and attached thereto at least 4 linear polyacrylate and/or methacrylate arms, each arm being linked to at least one silicon atom comprising the core by means of a chemical bond between a carbon atom contained in an ester group portion of the acrylate and/or methacrylate arm polymer and said one silicon atom of the core, said star polymer having a finite number average molecular weight.

2. A star polymer of claim 1 containing an average of from 5 to 500 arms.

3. A star polymer of claim 2 wherein the average ratio of core silicon atoms to arms is from 1:1 to 8:1.

4. A star polymer of claim 2 wherein the average ratio of core silicon atoms to arms is from 2:1 to 5:1.

5. A star polymer of claim 1, 2 or 3 wherein the number average molecular weight of the arms is from 1,000 to 20,000.

6. A star polymer of claim 1, 2 or 3 wherein the number average molecular weight of the star is from 5,000 to 500,000.

7. A star polymer of claim 1 or 2 wherein the arms consist essentially of poly(methyl methacrylate).

8. A star polymer of claim 1 or 2 wherein the core is comprised of silicon atoms each of which is bonded to a carbon atom which comprises an alkyl alcoholate ester group of said polyacrylate or polymethacrylate.

9. A star polymer of claim 1, 2 or 3 wherein the arms are derived from 3-(trimethoxy)silylpropyl methacrylate.

10. A star polymer of claim 1, 2 or 3 wherein the arms are derived from the initiator 1-trimethylsiloxy-1-(3-trimethoxysilyl)propoxy-2-methyl propene.

11. A star polymer of claim 3 wherein the arms are derived from 3-(trimethoxy)silylpropyl methacrylate and from 1-trimethylsiloxy-1-(3-trimethoxysilyl)-propoxy-2-methyl propene.

* * * * *